United States Patent
Perez et al.

(10) Patent No.: US 7,660,914 B2
(45) Date of Patent: Feb. 9, 2010

(54) AUXILIARY DISPLAY SYSTEM ARCHITECTURE

(75) Inventors: Juan Perez, Seattle, WA (US); Curt A. Steeb, Redmond, WA (US); Matthew P. Rhoten, Seattle, WA (US); Andrew J. Fuller, Redmond, WA (US); Christopher A. Schoppa, Redmond, WA (US); Adrian Chandley, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 753 days.

(21) Appl. No.: 10/838,174

(22) Filed: May 3, 2004

(65) Prior Publication Data

US 2005/0243021 A1    Nov. 3, 2005

(51) Int. Cl.
*G06F 3/00* (2006.01)
(52) U.S. Cl. .................................... 710/15; 710/16
(58) Field of Classification Search ............... 710/15–16
See application file for complete search history.

(56) References Cited

U.S. PATENT DOCUMENTS

| | | | |
|---|---|---|---|
| 4,004,277 A | 1/1977 | Gavril | |
| 5,363,502 A | 11/1994 | Kagimasa | |
| 5,649,023 A | 7/1997 | Barbara | |
| 5,745,105 A | 4/1998 | Kim | |
| 5,825,336 A | 10/1998 | Fujita | |
| 5,910,799 A | 6/1999 | Carpenter | |
| 5,960,214 A * | 9/1999 | Sharpe et al. | 710/15 |
| 6,035,339 A * | 3/2000 | Agraharam et al. | 709/246 |
| 6,096,096 A | 8/2000 | Murphy et al. | 717/11 |
| 6,191,758 B1 | 2/2001 | Lee | |
| 6,268,837 B1 | 7/2001 | Kobayashi | |
| 6,281,893 B1 | 8/2001 | Goldstein | |
| 6,327,482 B1 | 12/2001 | Miyashita | |
| 6,370,629 B1 | 4/2002 | Hastings | |
| 6,384,801 B1 | 5/2002 | Takahashi | |

(Continued)

FOREIGN PATENT DOCUMENTS

WO    WO01/75684    10/2001

OTHER PUBLICATIONS

Definition of "Driver", www.searchstorage.com, Nov. 9, 2003, http://searchstorage.techtarget.com/sDefinition/0,,sid5_gci212002,00.html, Accessed Jul. 13, 2007.*

(Continued)

*Primary Examiner*—Eron J Sorrell
(74) *Attorney, Agent, or Firm*—Workman Nydegger

(57) ABSTRACT

Described is an architecture by which application programs can provide data to auxiliary display devices of essentially any type for display to a user. A defined application layer (e.g., accessed via interfaces) allows programs to provide data to a service that controls the output of data to an auxiliary display device, and returns navigational data to the application upon appropriate user interaction with the device via actuators. Enumeration allows applications to discover the capabilities of a device, while arbitration determines which application has input-output rights to the device. The architecture further provides a protocol layer including pluggable protocol proxies that allow various types of displays to serve as an auxiliary display. This platform-like model allows program developers the ability provide programs that leverage auxiliary displays when available, and provides display manufacturers the ability to provide displays with extensible capabilities.

34 Claims, 9 Drawing Sheets

U.S. PATENT DOCUMENTS

| | | |
|---|---|---|
| 6,415,418 B1 * | 7/2002 | McLaughlin et al. ............ 716/3 |
| 6,438,577 B1 * | 8/2002 | Owens ....................... 709/203 |
| 6,694,389 B2 | 2/2004 | Coates |
| 6,750,830 B1 | 6/2004 | Teshima |
| 6,944,818 B2 | 9/2005 | Newman |
| 6,947,772 B2 | 9/2005 | Minear |
| 6,989,801 B2 | 1/2006 | Bruning |
| 7,024,415 B1 | 4/2006 | Kreiner |
| 7,030,837 B1 | 4/2006 | Vong |
| 7,047,339 B2 * | 5/2006 | Oakley ....................... 710/303 |
| 7,051,196 B2 | 5/2006 | Angelo |
| 7,092,943 B2 | 8/2006 | Roese |
| 7,123,212 B2 | 10/2006 | Acharya |
| 7,136,676 B2 | 11/2006 | Lee |
| 7,152,171 B2 | 12/2006 | Chandley |
| 7,187,951 B2 | 3/2007 | Kaida |
| 7,221,331 B2 | 5/2007 | Bear |
| 7,231,529 B2 | 6/2007 | Park |
| 7,240,228 B2 | 7/2007 | Bear |
| 7,249,323 B2 | 7/2007 | Ageta |
| 7,286,112 B2 | 10/2007 | Kinjo |
| 7,356,570 B1 | 4/2008 | Tuli |
| 7,356,706 B2 | 4/2008 | Scheurich |
| 2001/0003816 A1 * | 6/2001 | Kimmo et al. ................. 707/1 |
| 2001/0007140 A1 | 7/2001 | Landry et al. |
| 2001/0028366 A1 | 10/2001 | Ohki |
| 2002/0129006 A1 | 9/2002 | Emmett |
| 2002/0133601 A1 * | 9/2002 | Kennamer et al. .......... 709/229 |
| 2003/0006942 A1 | 1/2003 | Searls |
| 2003/0043110 A1 * | 3/2003 | Chaves et al. ............... 345/156 |
| 2003/0115415 A1 * | 6/2003 | Want et al. .................. 711/115 |
| 2003/0154492 A1 | 8/2003 | Falvo |
| 2003/0156074 A1 * | 8/2003 | Ranganathan et al. ........ 345/1.1 |
| 2004/0014488 A1 * | 1/2004 | Sawayama et al. ....... 455/550.1 |
| 2004/0223599 A1 | 11/2004 | Bear |
| 2004/0233930 A1 * | 11/2004 | Colby, Jr. .................... 370/464 |
| 2005/0005001 A1 * | 1/2005 | Hara et al. .................. 709/221 |
| 2005/0066089 A1 * | 3/2005 | Karaoguz et al. ............. 710/72 |
| 2005/0073471 A1 * | 4/2005 | Selbrede ........................ 345/4 |
| 2005/0192922 A1 | 9/2005 | Edlund |
| 2006/0194549 A1 | 8/2006 | Janik |

OTHER PUBLICATIONS

Office Action dated May 8, 2008 cited in related U.S. Appl. No. 10/837,900.
Office Action dated Feb. 28, 2008 cited in related U.S. Appl. No. 10/837,895.
Office Action dated Aug. 14, 2007 cited in related U.S. Appl. No. 10/837,894.
Office Action dated Dec. 27, 2007 cited in related U.S. Appl. No. 10/837,894.
Office Action dated Nov. 20, 2008 cited in U.S. Appl. No. 10/837,900.
Office Action dated Dec. 1, 2008 cited in U.S. Appl. No. 10/837,895.
Notice of Allowance dated Dec. 30, 2008 cited in U.S. Appl. No. 10/837,894.

* cited by examiner

AUXILIARY DISPLAY SYSTEM ARCHITECTURE

CROSS REFERENCE TO RELATED APPLICATIONS

The present application is related to the following copending United States Patent Applications filed concurrently herewith, assigned to the assignee of the present invention, and hereby incorporated by reference in their entireties:
"Processing Information Received at an Auxiliary Computing Device," Ser. No. 10/837,895;
"Context-Aware Auxiliary Display Platform and Applications," Ser. No. 10/837,894; and
"Caching Data for Offline Display and Navigation of Auxiliary Information," Ser. No. 10/837,900.

FIELD OF THE INVENTION

The invention relates generally to computer systems, and more particularly to an improved method and system for display of information on a computing device.

BACKGROUND OF THE INVENTION

U.S. patent application Ser. Nos. 10/429,930 and 10/429,932 are generally directed towards the concept of computer systems having auxiliary processing and auxiliary mechanisms, particularly display-related mechanisms, which provide some auxiliary computing functionality. For example, a small LCD on the lid or side of a laptop computer can provide its owner with useful information, such as a meeting location and time, even when the main computer display is not easily visible such as when a laptop computer's lid is closed and/or the main computer is powered down.

However, the usage of such auxiliary displays has heretofore been limited to narrow, limited operations in which a dedicated auxiliary display program is customized for the type of display and with respect to the information that is displayed. In such systems, the auxiliary display program is coded to the specifics of the type of display, such as the size and resolution, so that the program can output something that is readable yet fits within the screen area. This is unlike the regular computer system display, in which contemporary operating system components abstract from higher level programs the complexity and details of whatever specific video graphics adapter is installed. At the same time, dedicated auxiliary display code was a sensible solution, given that auxiliary displays typically have been two-or-three line text displays built into the hardware when manufactured, and all that was needed was to have the dedicated application write simple text with information such as a meeting time and the current time to the display.

One problem with the dedicated solution is that what is able to act as an auxiliary display is no longer necessarily a physically-dedicated device. Instead, as described in U.S. patent application Ser. No. 10/429,932, any device with a display that can interface in any virtually way with a computer system can potentially serve as an auxiliary display. Thus, for example, a mobile telephone, a pocket-sized personal computer or digital assistant can connect to another (e.g., desktop or laptop) computer either physically and/or via a wireless (e.g., Bluetooth) link, and if programmed to allow its display to be taken over by the other computer, the other computer can use the device's display as the auxiliary display. In fact, some portion of a desktop's or laptop's main monitor can serve as an auxiliary display. As can be readily appreciated, both the type of display and the available actuators (e.g., that allow scrolling on the auxiliary display) differ from device to device, and thus a dedicated program severely limits the usefulness of any such auxiliary display.

Another problem with a dedicated auxiliary display program is that only that program is able to provide information for display on the device. Although a dedicated program may, for example, be able to read information from an external source such as a compact audio disk currently being played, other application programs cannot provide their data for display unless such an application had intimate knowledge of the dedicated application program and the display requirements, and intimate knowledge as to how to make its data available to the dedicated program.

What is needed is a way for application programs that run under the main operating system of a computer system to provide appropriate data at appropriate times for display on an auxiliary display associated with that computer system, while at the same time allowing virtually any capable display, whether built-in as a dedicated auxiliary display or an independent device display, to serve as an auxiliary display.

SUMMARY OF THE INVENTION

Briefly, the present invention provides an architecture comprising a defined application layer (e.g., accessed via interfaces) that allows programs, including application programs and operating system components, to provide data to a service layer that controls the output of data to an auxiliary display device and handles any interaction of the device via actuators (e.g., buttons). The layered architecture further provides a protocol layer including pluggable protocol proxies that allow various types of displays to serve as an auxiliary display. This highly flexible, platform-like model allows program developers the ability provide programs that leverage auxiliary displays when available, and provides display manufacturers the ability to provide displays with extensible capabilities. As a result, the auxiliary display model and architecture of the present invention extend the user experience by allowing the user to view at a glance and compact yet important information at one or more various locations associated with a computer system, including at times when the main components of the computer system are powered down. Note that "auxiliary display device" generally refers to the auxiliary display screen and/or any actuators associated with that screen as well as any other hardware, firmware or software in the device, and that the auxiliary display device may contain indicators (e.g., individual LEDs) instead of or in addition to a pixel-type display screen.

In one implementation, there is provided an auxiliary device service having a mediation component that handles enumeration and arbitration. Enumeration refers to providing a way for computer programs running on an operating system to determine the capabilities by the means of an asynchronous event or querying of capabilities of an auxiliary display and its corresponding actuators, so that the applications can tailor their output and input accordingly as desired, e.g., color, resolution, navigation commands, and so forth. For example, if an application knows that the auxiliary display device has a high-resolution color screen and four-way navigation buttons, that application can, if desired, output richly formatted data to the auxiliary display and adjust to accept navigation commands in four directions.

Arbitration is also provided in the mediation component of the service layer to provide a mechanism that determines which application or operating system component should be having its data currently displayed; note that the application and other programs take turns sharing the display as appropriate. Often the program currently coupled to (similar to having focus on) the display device was user-selected, such as by navigating to from a home page, however other events may take precedence over the user's selection (which may have been made long ago). For example, if an event occurs such as a meeting reminder, a phone call, a return to home page timeout, a low power condition, or something that is considered likely more important to display than what is currently being displayed, the auxiliary display can change, either entirely to show another application's data or a shell application home page, or in some way (e.g., flash or take up part of the screen) to indicate the event. Note that it is possible to have more than one auxiliary display, and also one or more indicators such as LEDs, whereby arbitration determines the data mapping between application programs and the like to and from each such display and/or indicator.

Beneath the application-related components of the service layer is a communications-related interface into which a protocol proxy (e.g., a DLL, or dynamic link library) plugs in, which may be automatic or largely automatic in response to the initial detection of the presence of a coupled auxiliary display. In this manner, communication with any auxiliary display device is possible for which an agreed-upon protocol exists, (e.g., to connect over a USB HID or Bluetooth interface/protocol and the like, and even, for example, to connect to a web service located essentially anywhere in the world).

Because of the pluggable protocol proxy, the communication details and requirements are abstracted from the application programs and the mediation component. In essence, the application programs only see an auxiliary device service through suitable interfaces to properly exchange data with the auxiliary display device. Likewise, the auxiliary display device only sees the interfaces it needs to properly exchange data with the higher-level components.

In one implementation, the auxiliary display can have its own CPU (essentially anything from an embedded controller to a powerful processor) and memory, and this firmware can operate in conjunction with the main computer operation, referred to herein as "online," or operate when the main computer is "offline," e.g., the computer is powered down to some extent, e.g., completely powered down or in a sleep/standby/hibernation state, or the like (e.g., ACPI states S3-S5). When online, an online interaction manager receives user input and may pass corresponding data to the application program and a display controller for processing, while when offline, an offline interaction manager receives user input and based on cached data works with a microcontroller to control the auxiliary display output, as described in the aforementioned U.S. patent application entitled "Caching Data for Offline Display and Navigation of Auxiliary Information."

Other advantages will become apparent from the following detailed description when taken in conjunction with the drawings, in which:

DETAILED DESCRIPTION

Exemplary Operating Environment

Figure 1:
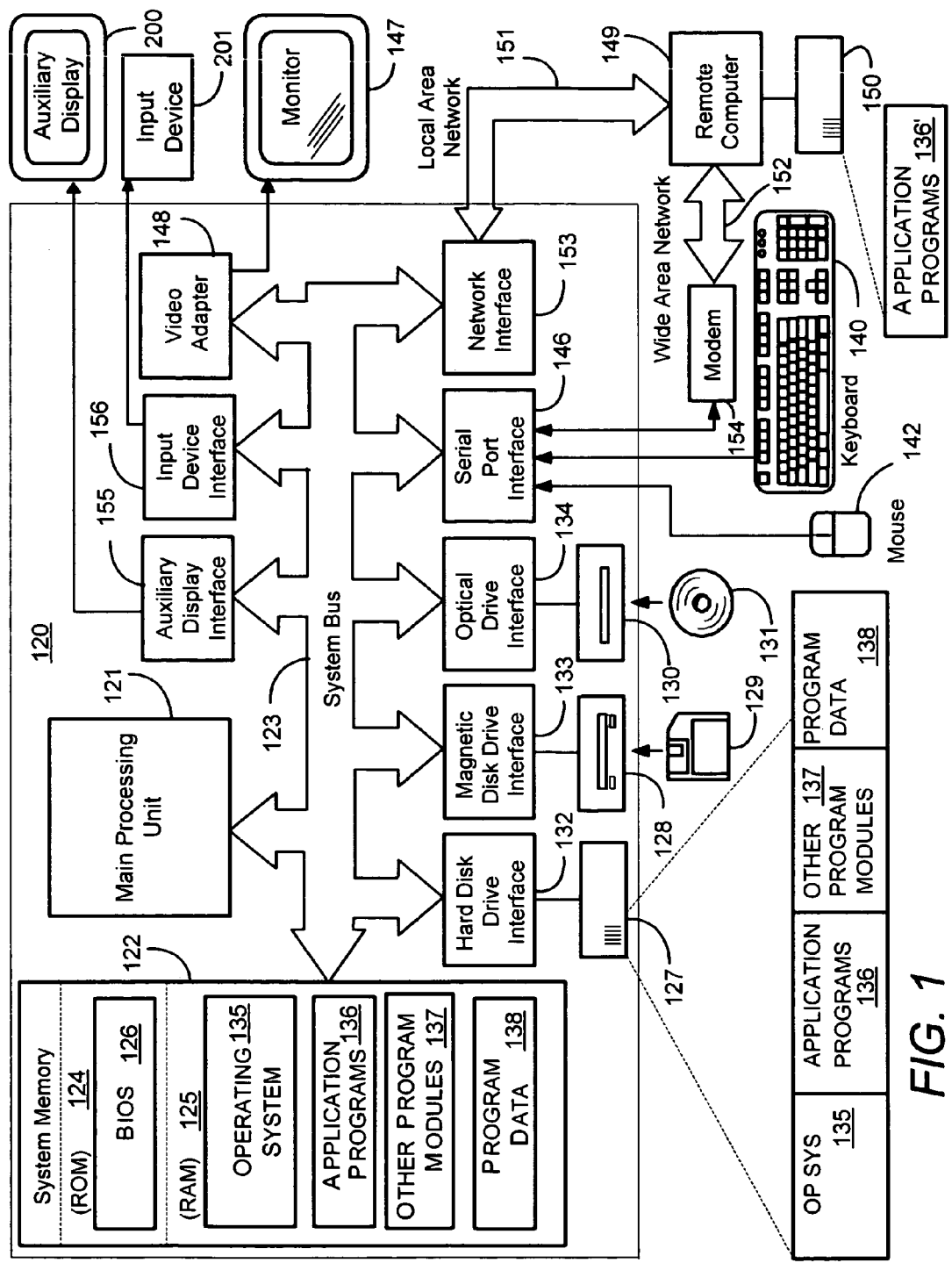
FIG. 1 is a block diagram representing a general purpose computing device in the form of a personal computer system into which the present invention may be incorporated.

FIG. 1 is a block diagram representing a computing device 120 in the form of a personal computer system into which the present invention may be incorporated. Those skilled in the art will appreciate that the personal computer system 120 depicted in FIG. 1 is intended to be merely illustrative and that the present invention may be practiced with other computer system configurations, including hand-held devices, multi-processor systems, microprocessor-based or programmable consumer electronics, network PCs, minicomputers, mainframe computers, headless servers and the like. The invention may also be practiced in distributed computing environments where tasks are performed by remote processing devices that are linked through a communications network. In a distributed computing environment, program modules may be located in both local and remote memory storage devices.

The personal computer system 120 included a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124. The personal computer 120 may further include a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer

120. Although the exemplary computer system described herein employs a hard disk, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary computer system.

A number of program modules may be stored on the hard disk, magnetic disk 129, optical disk 131, ROM 124 or RAM 125, including an operating system 135 (such as Windows® XP), one or more application programs 136 (such as Microsoft® Outlook), other program modules 137 and program data 138. A user may enter commands and information into the personal computer 120 through input devices such as a keyboard 140 and pointing device 142. Other input devices (not shown) may include a microphone, joystick, game pad, satellite dish, scanner or the like. These and other input devices are often connected to the processing unit 121 through a serial port interface 146 that is coupled to the system bus, but may be connected by other interfaces, such as a parallel port, game port and/or universal serial bus (USB). A monitor 147 or other type of display device is also connected to the system bus 123 via an interface, such as a video adapter 148. In addition to the monitor 147, personal computers typically include other peripheral output devices (not shown), such as speakers and printers. An auxiliary display 200 is an additional output device, and may, for example, be connected to the system bus 123 via an auxiliary display interface 155. An auxiliary display 200 may also connect to a computing device 120 through a serial interface or by other interfaces, such as a parallel port, game port, infrared or wireless connection, universal serial bus (USB) or other peripheral device connection. An input device 201 in FIG. 1 may provide one or more actuators to interface with and/or control the auxiliary display 200, and for example may be connected to the system bus 123 via input device interface 156, which may be a serial interface, or by other interfaces, such as a parallel port, game port, infrared or wireless connection, universal serial bus (USB) or other peripheral device connection.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, Intranets and the Internet.

When used in a LAN networking environment, the personal computer 120 is connected to the local network 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

It should be noted that the computer system need not be fully operational for an auxiliary display to work in accordance with the present invention. Indeed, as described below with reference to FIG. 6, an auxiliary display may still work when the computer is powered down, at least to a default extent or to an extent configured by a user, such as when the computer system is in a sleep state, standby or a hibernate mode, (e.g., ACPI states S3-S5) and/or when the user has not yet logged on or is otherwise locked out of the system via security mechanisms. For example, the user may want a telephone handset and speakerphone that are integrated into a personal computer to work as conventional appliances when the computer system is powered down, and use the auxiliary display as a caller-ID device. This device may also store data for later transmission to the computer system when the computer system is again powered up, such as to log the calls received, including when the computer system was not fully powered up.

The auxiliary display may supplement the main display and may also serve as a surrogate display when the main display is shut down or otherwise not operational (e.g., disconnected), to give the user some information. For example, information such as how to power up the main display might be helpful, as would a room number and/or directions to a meeting on an auxiliary display device connected to a mobile computer that the user can view when the main display is off and/or not easily visible (e.g., the lid of a laptop is closed). Note that even on a tablet PC with a continually visible screen, the main display may be shut down to save power, whereby an auxiliary display may provide substantial benefits. Note that the user may limit the extent of the display based on the computer system state, e.g., when the user is not logged in, only certain non-sensitive or very specifically-controlled information may be displayed, and so forth.

To enable and control communication in these powered-down modes, firmware may exist, stored in non-volatile memory, that when loaded and operated on by a secondary processor, enables the auxiliary display, along with other auxiliary components to be used, as long as some power is available. In other words, the secondary processor has associated memory (NVRAM, and potentially some ROM as well); the firmware is loaded onto either the NVRAM or the ROM to be executed by that secondary processor. Note that as used herein, the term "firmware" can be generally considered as representing the auxiliary memory, the code therein and/or the secondary processor on which it runs.

Figure 2A:
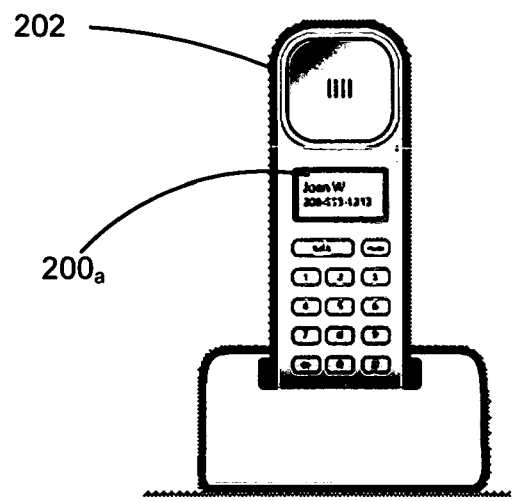
FIGS. 2A-2E are exemplary illustrations each generally representing a location for placement of an auxiliary display on various devices.
Figure 2B:
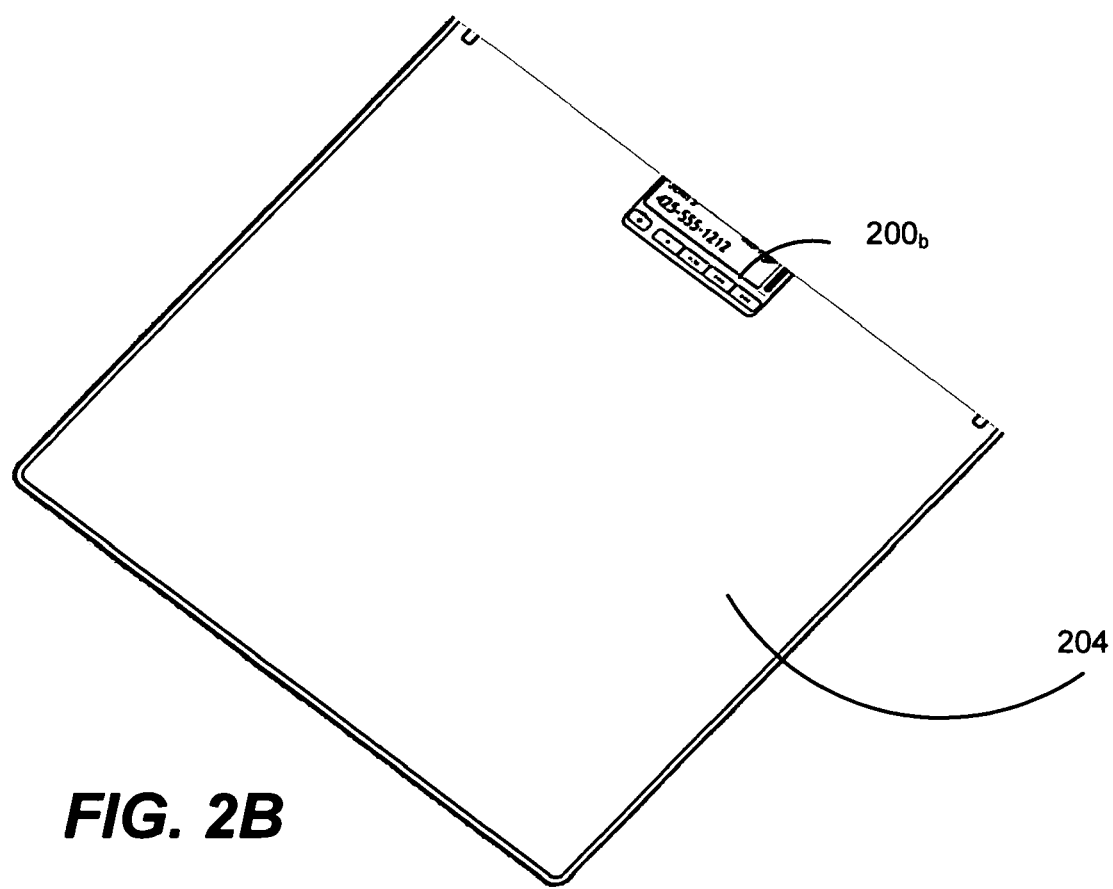
Figure 2C:
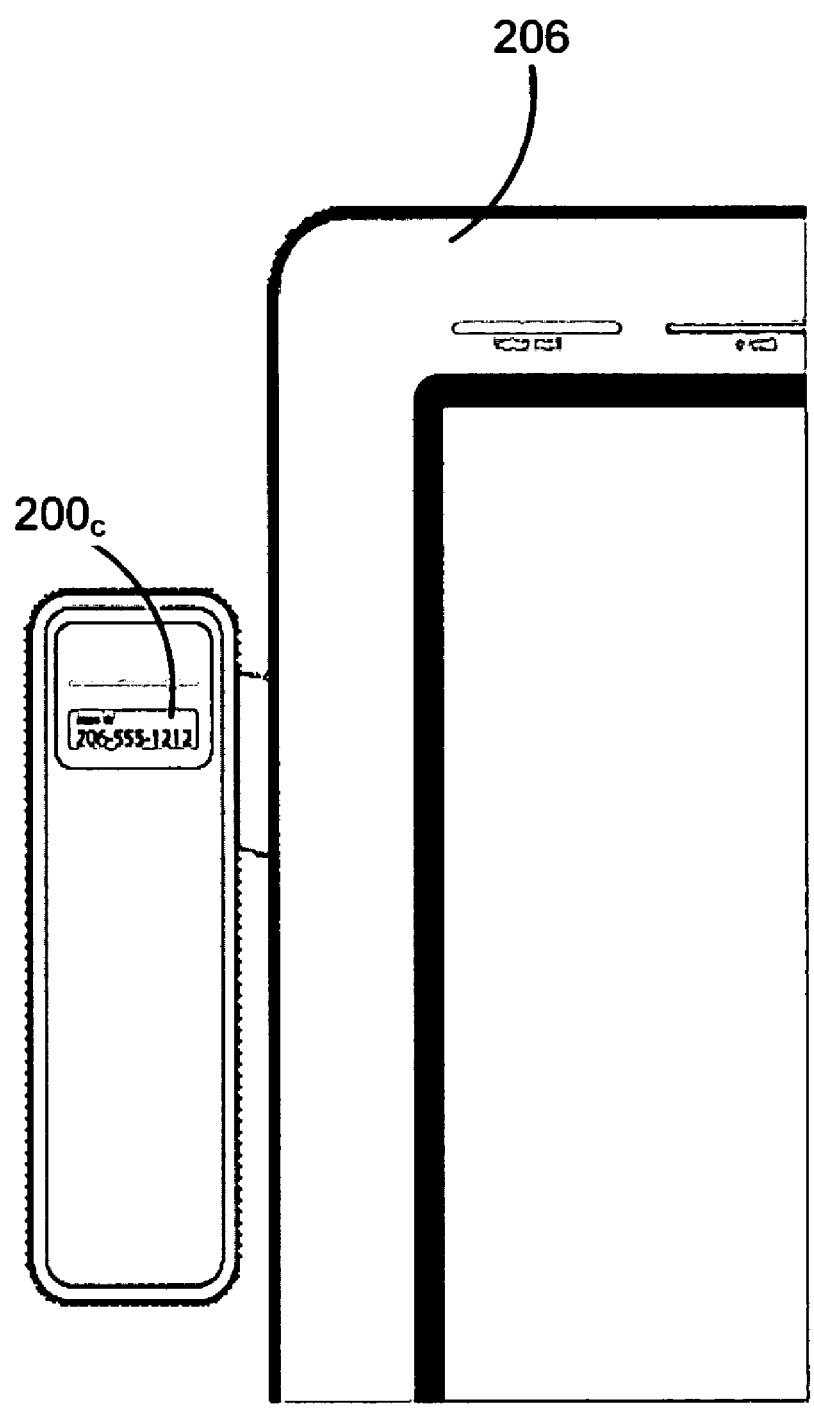
Figure 2D:
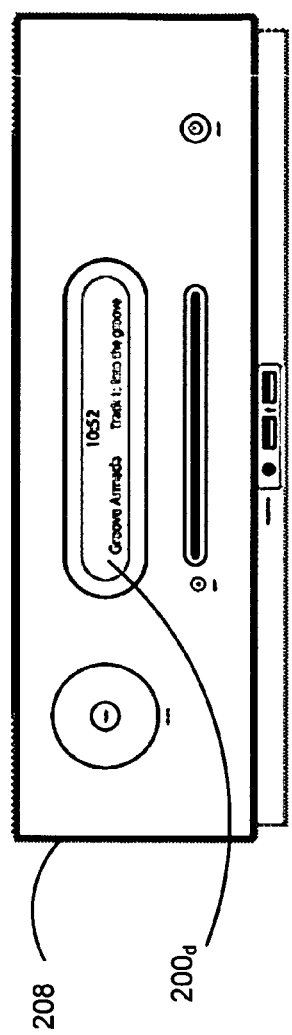
Figure 2E:
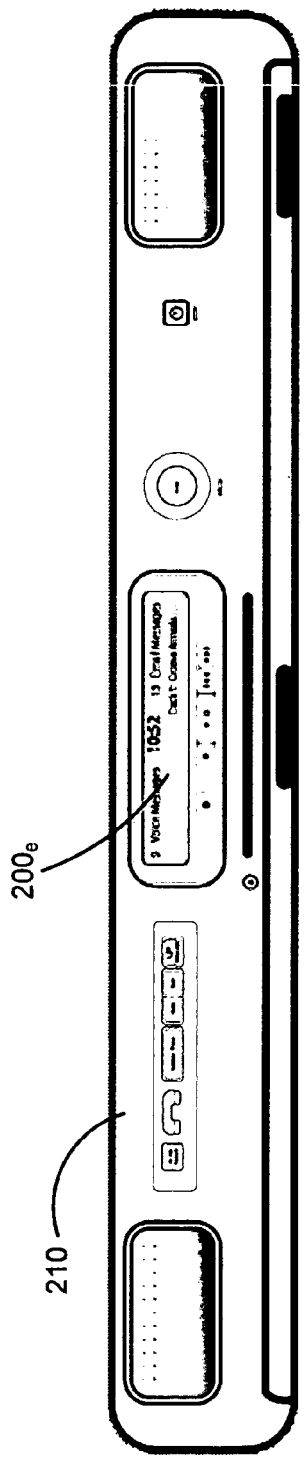

FIGS. 2A-2E illustrate exemplary locations on or associated with computing devices for placement of auxiliary display screens $200_a$-$200_e$, respectively. As represented in FIGS. 2A and 2B, an auxiliary display screen $200_a$ may be placed on the front, back or other surface of a standalone (landline or mobile) phone 202, (which need not be physically coupled if otherwise linked such as via Bluetooth technology) and/or another auxiliary display screen $200_b$ placed on the edge or lid of a mobile computer 204 or tablet computing device (not shown). Another place for an auxiliary display screen $200_c$ (FIG. 2C) may be on a phone mounted on a computer or a peripheral device attached to a computer such as on monitor 206 or on a keyboard (not shown). FIGS. 2D and 2E illustrate additional placements of auxiliary display screens $200_d$ and $200_e$ on the front panel of a standalone console 208 connected to a computer, or some other housing 210 (such as a housing for the motherboard), respectively. Those skilled in the art will appreciate that an auxiliary display screen may be placed on any surface of any computing device or other device having display capabilities, such as placed on a watch with a wireless or other connection to a computer, on a remote control device, on a remote wall-mounted unit, and so forth.

As should be apparent from FIGS. 2A-2E, an auxiliary display may be in the form of any number of known types of displays such as one or more LEDs, a 2-line alphanumeric display, a monochrome display, or a color display. Those skilled in the art will appreciate that the present invention may also use the display of other computing or communication devices as the auxiliary display 200. These other computing or communication devices include general purpose computers, cell phones, and handheld devices such as a pager or a personal digital assistant (PDA). Additionally, the present invention may use a virtual auxiliary display implemented within an area of the onscreen display of the computing device 120 (e.g. a screensaver or a component of the graphical user interface) as the auxiliary display 200, including before a user has logged in. The auxiliary display 200 may include a combination of any of the forms described above, and also be physically or logically combined with indicators such as one or more LEDs and/or used in conjunction with a virtual auxiliary display.

Even absent a screen, one or more LEDs may be advantageously used as the auxiliary display 200 for notification about the occurrence of an activity regarding an application program running on the main computer system. Such an auxiliary display may be implemented with low costs and less power consumption and provide notification in an unobtrusive manner. It may be effectively used for systems with extremely tight form factors or for systems where communications for users are managed by another person. An auxiliary display 200 may additionally be effective when notifications need to be seen from a distance. An auxiliary display also may be used in conjunction with an onscreen virtual auxiliary display when there is informational content associated with the activity, such as notification of a new email message. In this case, content from the email may also be displayed on the virtual auxiliary display 200. Furthermore, an auxiliary display 200 may be effectively used for public systems (libraries or kiosks) or shared computers when display of content is undesirable.

Alternatively, a 2-line alphanumeric display may be advantageously used as the auxiliary display 200 where cost or space is critical, but notifications and basic content are desired. It may be effectively used for tablet PCs, laptops, budget PCs, phone docking stations, monitor bezels, and small or low-cost PC appliances or peripherals such as a handset, keyboard, or remote control. It may also be effectively used as a replacement for (and an improvement to) a caller ID box.

Furthermore, a monochrome or color multi-line display may be advantageously used as the auxiliary display 200 for media-rich applications, high-end consumer systems or media center systems. It may be effectively used for high-end laptops with more generous form factors or where an emphasis is placed on communication, full-function PCs with a heavy business or communications emphasis, front panel displays for rack-mounted servers, media centers or high-end media appliances (including remotes, console systems with portable media functionality) and mobile auxiliary displays.

Additionally, the display of another computing or communication device may advantageously be used as the auxiliary display 200 where users can expand the role of these supplemental devices when using their PC. These other computing or communication devices include general purpose computers, cell phones, and handheld devices such as a pager or a personal digital assistant (PDA). Further, note that the auxiliary display need not be an actual display, but can be a projection (e.g., onto a wall) of the information. An auxiliary display, as referred to herein, may be composed of essentially anything that can be sensed, including any visual, audible, and/or tactile representations.

As mentioned previously, a virtual auxiliary display may be used as the auxiliary display 200 for public systems (libraries or kiosks) or shared computers when display of content is undesirable. It may also be effectively used for low-cost systems or for devices with very minimal form factors that make even LEDs impractical. A virtual auxiliary display may be implemented as a screensaver or as a component of the graphical user interface.

The input device 201, hereinafter referred to as actuators (in plural, even if only a single mechanism such as a button or pointing device), provides the user with a mechanism to switch between different categories of application data or notifications such as email notifications, voicemail notifications, calendar notifications, system status notifications, caller ID lists and other types of notification messages. Accompanying such a switch button may also be an up button and a down button to allow the user to scroll forward and backward through the notification messages within a particular category. Those skilled in the art will appreciate that any other types of actuators may be used, such as a keyboard, microphone, joystick, game pad or other device including a device that contains a biometric sensor, environmental sensor, position sensor, or other type of sensor. Any of the input devices of the computing device 120 that is represented in FIG. 1 may be used as the input device (actuators) 201, and may be used in conjunction with independent actuators.

Auxiliary Display System Architecture

As will be understood, the present invention provides an auxiliary display 200 for a user to simply and rapidly view glance-able information concerning peripheral tasks without distraction or the need to switch operating focus from the current task onscreen, if any. In keeping with the present invention, the user may select, to an extent, what information appears on the auxiliary display by using actuators 201 to select among application program data. Although program data and event notifications will be used to illustrate the auxiliary display of information, it should be understood that the present invention may provide auxiliary display of other types of information such as from Internet-related services including transaction services, auction services, advertising services, entertainment services, and location services. Such services can provide a wide variety of information including financial transaction information, headline news, stock quotes, sport scores, weather and other information, including information specifically requested by the user as well as unsolicited information. It will also be appreciated that the auxiliary display 201 may be operative using any number of known types of displays such as a set of notification lights, a 2-line alphanumeric display, a monochrome display, or a color display. Note that as used herein, for simplicity "auxiliary display device" will generally refer to the auxiliary display screen and/or the actuators associated with that screen as well as any other hardware, firmware or software in the device, however it should be understood that the screen and actuators may be independent mechanisms, and/or that there may not be actuators requiring physical contact to input data. Further, note that the auxiliary display device may be considered as possibly containing indicators (e.g., individual LEDs) instead of or in addition to a pixel-type display screen.

Figure 3:
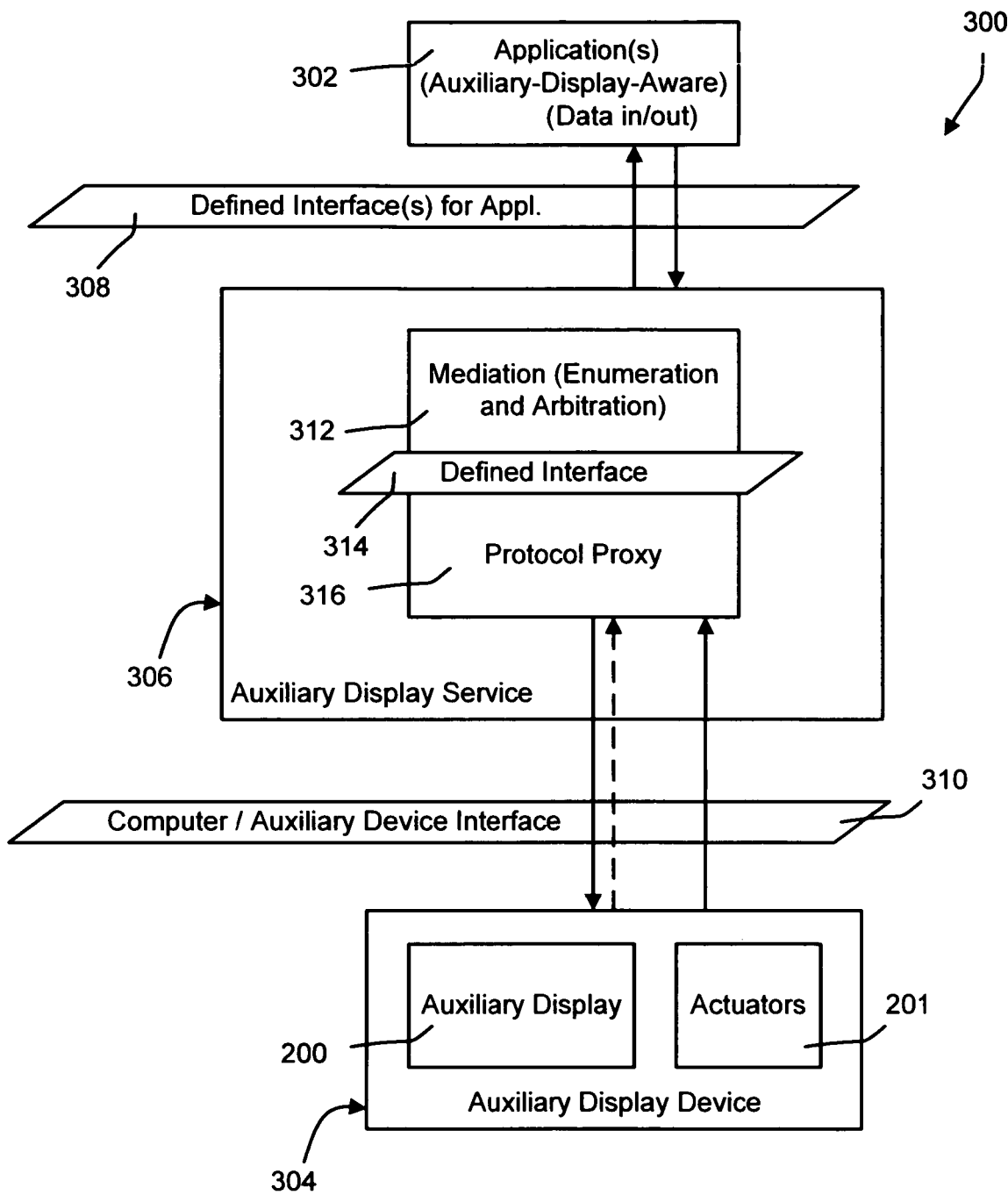
FIG. 3 is a block diagram generally representing a layered architecture by which application programs can exchange data in an abstracted manner with an arbitrary auxiliary display device, in accordance with an aspect of the present invention.

In accordance with an aspect of the present invention, as generally represented in FIG. 3, there is provided an architecture 300 by which one or more application programs 302 can interface with virtually any type of auxiliary display device 304, to output data to its display 200 and/or interact with the user via actuators 201. Such an application program 302 (or via an associated plug-in component coupled to the application program) is one that has been programmed to know of auxiliary displays (that is, are auxiliary-display-aware), and thus can use an auxiliary display device 304 whenever one is present to exchange information with a user and thereby provide an improved user experience. Note that as used herein, the concept of an "application" or "application program" represents conventional programs as well as operating system components that may want to provide data to an auxiliary display and/or have interpretation occur therewith through an auxiliary display device's associated actuators.

To allow any auxiliary-display-aware application program 302 to use an auxiliary display device 304, an auxiliary display service 306 is installed on a computer system, providing an application model/layer through which application layer programs running on the normal computer operating system can communicate with the auxiliary device 304 to display information on its display 200 and/or receive commands such as navigation commands via actuators 201. To this end, the application program 302 exchanges data, via defined interfaces 308, with an auxiliary display service 306 (of a service layer). In turn, as described below, the auxiliary display service 306 exchanges the data with the auxiliary display device 304. As a result of this highly-flexible model, any program, including those not yet developed, can thus use the auxiliary display device 304 by properly implementing the defined interface set 308. Note that anytime the service loads a plug-in as a DLL that is not running as a separate process, the code that is inside the DLL is run in the security context of the user process, rather than the security context of the service (that is, of the system).

Further, in one implementation the auxiliary display service 306 abstracts the auxiliary display device hardware (as well as any device firmware or software) from the other layers, whereby any suitable device can serve as an auxiliary display device, including devices not yet developed. To this end, the architecture 300 provides a protocol layer, by which the service 306 communicates with the device firmware/hardware over a suitable communication protocol/interfaces and wired or wireless device interface 310. Any existing or future protocol that the display service 306 and auxiliary display device 304 both appropriately implement will suffice, as will any corresponding physical or wireless computer-to-device interface 310 (including those not yet developed).

As described below, in one implementation, the mediation component 312 (e.g., that handles enumeration and arbitration) is abstracted from the communication mechanisms via a defined interface 314 into which a protocol proxy 316 plugs in, as appropriate for the communications protocol being used. Note that the protocol proxy is shown in FIG. 3 as being part of the auxiliary device service 306, however what is considered part of the service is somewhat arbitrary, and thus the protocol proxy can be alternatively considered as part of the protocol layer. In any event, the layered architecture provides high flexibility to application developers and display device manufacturers.

Figure 4:
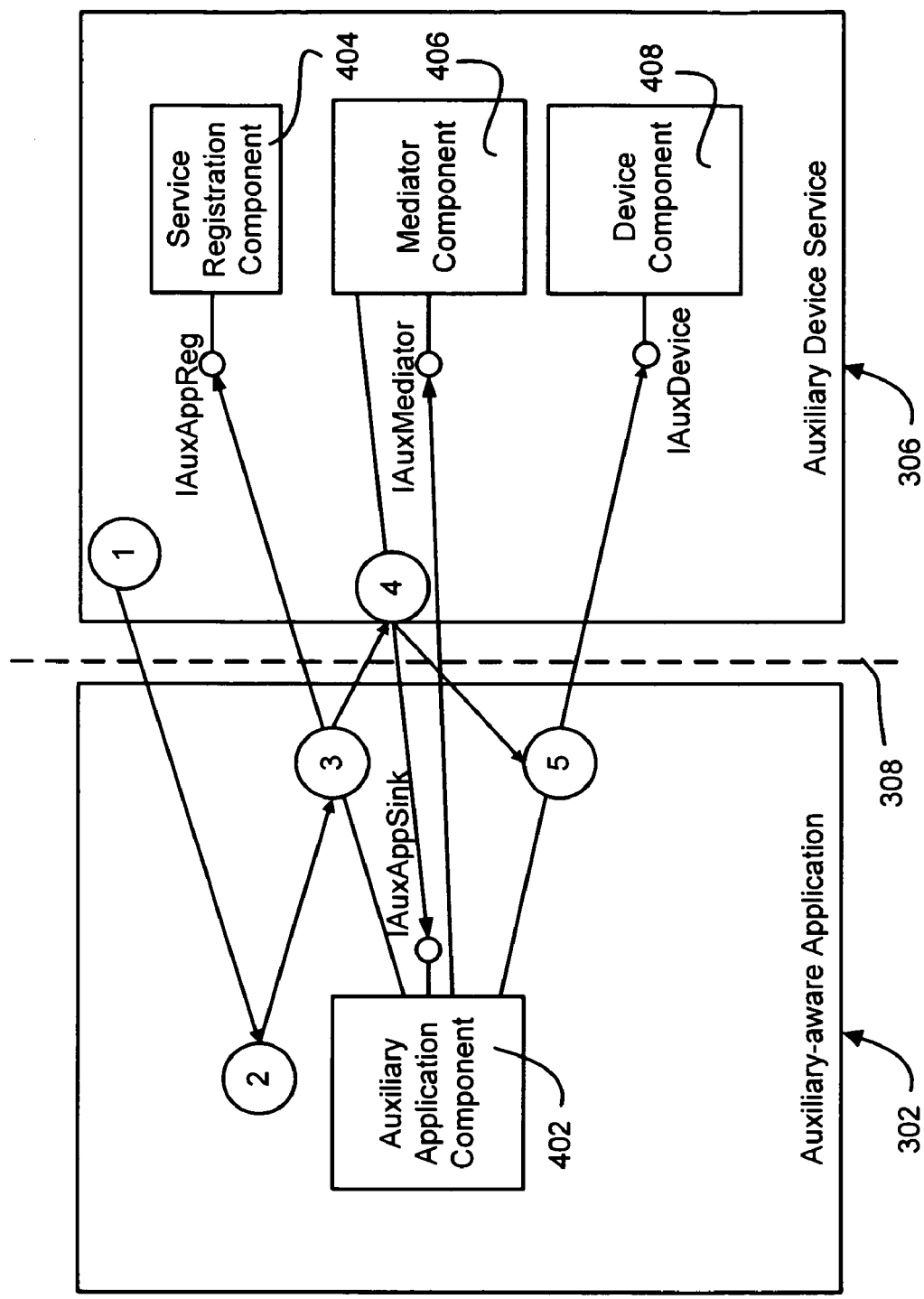
FIG. 4 is a representation of how in one implementation, an auxiliary-aware application program interfaces with an auxiliary display service to exchange data with an auxiliary display device, in accordance with an aspect of the present invention.

Turning to FIG. 4 and an explanation of the application and service layer operations, an application program 302 may be extended as desired to present some of its data to users via an auxiliary display device 304. This may be accomplished by developing the application program 302 to directly understand the auxiliary display service interfaces 308, and/or by associating with the application program 302 a component that understands the interfaces 308. For example, a plug-in (e.g., in the form of a DLL) allows application developers to easily extend their application programs without changing the main application code (except to link to the plug-in) by using exposed interfaces to application data. Note that FIG. 4 depicts the auxiliary application component 402 as being within the application program 302, however it is understood that this is only a representation and thus the component 402 may be within the application code itself or be a pluggable component such as a DLL plugged into the application. Further, it should be understood that the application program itself may not be providing its data for display. For example, another program that may be independent of the application program may present data corresponding to the application program; to this end, for example, by hooking the application program's function calls, the other program can provide data to the auxiliary display device 304 that appears to be coming from the application program.

As represented in FIG. 4, the application-to-service layer provided by the auxiliary display service 306 provides various structure and functionality, including auxiliary plug-in registration, by which an application/plug-in registers itself with a service registration component 404 of the auxiliary display service 306, whereby the application/plug-in has the ability to use the available auxiliary device 304. In the example implementation of FIG. 4, the service registration component 404 provides an IAuxAppReg interface for this purpose. Other application programs likewise register themselves via this interface. Note that the names used herein are only examples and any suitable interface name will suffice.

The auxiliary application component 402 has ability to receive events from the associated auxiliary display device and/or related resources. For example, an event may be sent to the auxiliary application component 402 upon an auxiliary device becoming available for sending data thereto, while another event could correspond to user interaction with the auxiliary device actuators. In the example implementation of FIG. 4, the application program implements an IAuxAppSink interface to receive such events.

As also described above, the application program 302 has the ability to enumerate the available auxiliary hardware device or devices that are available. In the example implementation of FIG. 4, a mediator component 406 in the auxiliary device service 306 provides the enumeration via an IAuxMediator interface. In this manner, the device or some data related to the device (e.g., a corresponding XML file) can report the capabilities of the device display screen or the like and/or its actuators to the application program 302. The application program 302 may then adjust the output and input according to the display, e.g., color scheme, resolution, navigation commands, and so forth can be modified for the device characteristics. For example, if an application program 302 knows that the auxiliary display device has a high-resolution color screen and four-way navigation buttons, that application can output richly formatted data to the auxiliary display and adjust to accept navigation commands in four directions. Alternatively if only a two-line text display is available, the application program 302 can output simple text.

Note that configuration information for the auxiliary device also can be passed from the service to the device. For example, a backlight timer period, font type, font size, password data, commands to enable/disable the screen and so forth may be sent from the service running on the main computer system. Note that device configuration may be entirely independent of enumeration, although at times it may be convenient to negotiate device settings between the auxiliary device and a program running on the main computer, e.g., enumerate the device capabilities to determine at a running program what the device can do, and based on those capabilities (which may be variable), configure the device as desired for that running program at that particular time.

Arbitration is also provided in the mediation component 406 of the application layer, to provide the mechanism that determines which application should be having its data currently displayed and receiving navigation commands. Note that the application programs take turns sharing the display as appropriate; in other words, the arbitration function of mediation manages the priority (z-order) of the auxiliary application programs and/or plug-ins. Because auxiliary devices may have only small amount of display space, (or even be as little as a single LED), in one implementation only one application gets the entire display at a time, although it is feasible in alternative implementations to split a display and/or indicators among applications at the same time if sufficient screen space is available or a screen and indicators are available on the same device, or otherwise provide information from two or more applications (e.g., the device could show one application's data but flash when another application is in a changed state, essentially requesting but not demanding that the user pay some attention).

Arbitration is also provided in the mediation component of the service layer to provide a mechanism that determines which application or operating system component should be having its data currently displayed; note that the application and other programs take turns sharing the display as appropriate. Generally, the user is provided with a home page, which displays the (e.g., registered) applications to which the user may navigate. In the event that the user of the system is switched, that is, to another user (or when one user logs out and another logs on), the service is be notified and will prepare and send appropriate data to the auxiliary display device, based on the applications that are registered for the specific user who has just logged into the system.

Arbitration is often straightforward, such as when the program currently coupled to (similar to having focus on) the display device is user-selected, such as by navigating to/from a home page. However other events may take precedence over the user's selection (which may have been made long ago). For example, if an event occurs such as a meeting reminder, a phone call, a return to home page timeout, a low power condition, or something that is considered likely more important to display than what is currently being displayed, the auxiliary display can change, either entirely to show another application's data or a shell application home page, or in some way (e.g., flash) to indicate the event. Note that it is possible to have more than one auxiliary display, and also one or more indicators such as LEDs, whereby arbitration determines the data mapping between application programs and the like to and from each such display and/or indicator.

Once a program is allowed to write to the display and receive commands via its actuators, auxiliary system referencing provides the ability to blit/render to an abstracted memory buffer that allows the currently selected auxiliary application (e.g., plug-in) component 402 to use the display resources. In the example implementation of FIG. 4, a device component provides an IAuxDevice interface for the application program to provide its data to the device via the service layer. Note that application data may be processed before passing through the service layer, e.g., to structure the data in some manner such as a tree or graph to faciliate rendering as well as caching, as described in the aforementioned U.S. patent application entitled "Caching Data for Offline Display and Navigation of Auxiliary Information."

By way of summary, the arrows labeled with circled numerals one (1) through six (6) correspond to the generalized timeline of an auxiliary application's boot-strapping and execution. As represented by arrow one (1), the auxiliary device service begins. At arrow two, as part of its initialization process the service creates out-of-process application COM objects. The out-of-process COM objects support the IAuxAppSink interface. Note that the application implements the IAuxAppSink interface, and passes that sink to the IAuxAppReg interface at registration time, where the objects implementing the sink interface are then used by the service.

As represented by arrow three (3), the auxiliary application component (e.g., an object) calls into the IAuxAppReg interface of the service registration component (e.g., an object method) of the auxiliary device service 306 to subscribe to one or more auxiliary devices. Each available device may be listed by a specific identity returned from the call, or can simply be identified as being available, in which event enumeration can determine the characteristics of each device.

As represented by arrow four (4), following registration, the registration service 404 essentially identifies the mediator component (e.g., an object) to the auxiliary application component 402, by returning an IAuxMediator object interface from the registration component. The service's mediator component (object) keeps a copy of the IAuxAppSink interface so that the mediator 406 can request that the application component 402 respond to an actuator event draw on a display or set the state of an indicator. Note that when online, the system works like the well-known WM_PAINT model, in that an applications is instructed by the service when it is the application's turn to render data, (e.g., "focused" except the data is written to the auxiliary display or indicator in this instance). Further, note that the concept of the currently "focused" application also applies to actuators, that is, when the user presses an actuator, an event is sent to the currently focused application, but no others.

Numbered arrow (5) in FIG. 4 represents the mediator component 406 passing an IAuxDevice interface to the auxiliary application via IAuxAppSink. The application in turn uses that interface to actualize the request via the device component.

Figure 5:
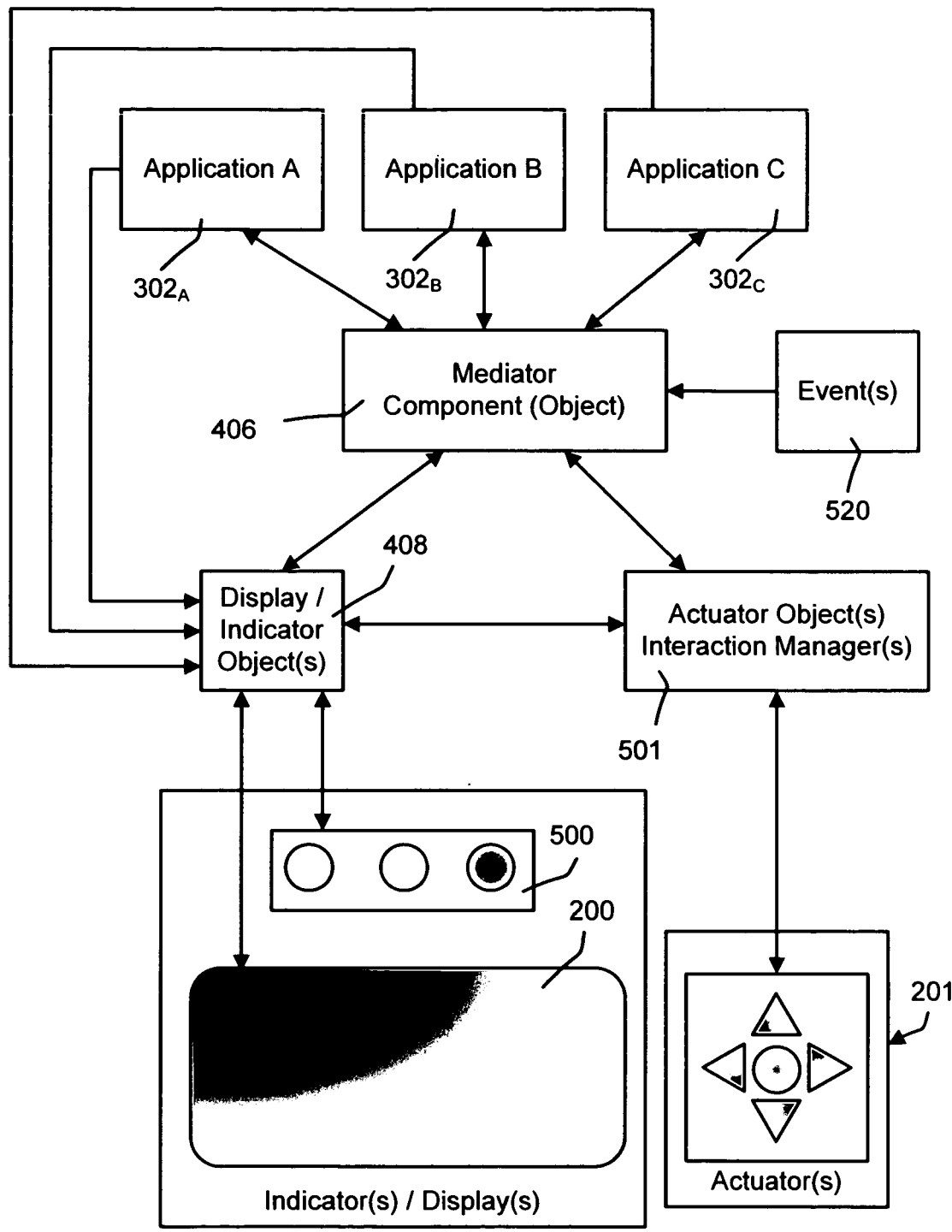
FIG. 5 is a block diagram generally representing multiple application programs each capable of selectively coupling for data exchange with an auxiliary display device based on mediation, in accordance with an aspect of the present invention.

FIG. 5 shows multiple application programs $302_A$-$302_C$ connected to a mediator component (object) 406. Although three such application programs $302_A$-$302_C$ are shown, it is understood that any practical number is feasible. In general, the mediator component 406 determines which application program should be currently having its data displayed on the auxiliary display 200 (and/or on a set of one or more indicators 500), and/or should be receiving user input data from the actuators 201. If more than one auxiliary display device is present, the mediator component (object) 406 maps the applications to the devices; at any one time, different auxiliary devices may each display via indicators or a display screen the data of a different application program, or any one application may have its data displayed on more than one auxiliary device at a time. Note that the same application thus may output data to two or more displays, however the application's data may be different for each auxiliary device. For purposes of simplicity, the following explanation will refer to a single auxiliary display device that outputs to a display (rather than to an indicator set).

In FIG. 5, an actuator object referred to as an interaction manager 501 manages the user interactions with the actuators 201 corresponding to the auxiliary display. This interaction may include the user input of navigational commands that tell the mediator component (object) 406 to change which of the applications is to have its data displayed. The command may also be one directed to the currently auxiliary-display-active application program, e.g., to display some of its data such as the body of a selected email message. Alternatively, an event 520 such as a timed event may be received and processed by the mediator component 406 to make such a change automatically in response to the event. A lookup table or the like maintained by the mediator component can map events (or internal timers) to actions.

It should be noted that the interaction managers need not rely entirely on the application programs to change the display. For example, a "home page" program that lists available application programs from which a user can select may be built into the interaction manager and/or the display object 408. Until an application is selected, the home page program adjusts the display (e.g., highlights and/or scrolls a list of available applications) in response to user interaction with the actuators 201 until the user selects one of the applications. As another example, the running programs and/or the auxiliary service may send event-related data to the auxiliary device, whereby the auxiliary device can take actions without requiring further instruction from the programs. For example, a time-related event such as "display this particular image at a certain time," may be sent to the auxiliary device, as can a command such as "wake the main computer if asleep and a wireless networking signal is detected."

In one implementation, upon detection of such an application selection or other change request (e.g., event based), the mediator component 406 sends an event to the newly selected or currently selected application to instruct that application to provide appropriate data to the display object 408 for display. If changing from one application program to another such as because of a timed event, or changing back to the home page, the mediator component 406 may also send an event to the formerly active application to indicate that it no longer is having its data displayed. Note that with multiple displays and/or indicators, the mediator component can remap applications to display objects when changes occur, and thus a mechanism for indicating which display, displays and/or indicators that an application is outputting data to may be needed to inform the application of how to tailor its data for another device.

The display object for any auxiliary display device can ensure that data is appropriate for its corresponding display, e.g., text to an LED would be meaningless (unless that text corresponded to a particular display state such as a color and/or flash pattern). Further, the display object can reformat data as appropriate, e.g., color to grayscale, text to a bitmap for display, and so forth.

The actuators 201 can also change the state of a currently selected application program that is having its data displayed. For example, when selected, an email application program can display a list of email messages, which can be scrolled by the application program in response to received actuations at appropriate buttons. Upon selection of an email message, the application may change its state to output the contents of the selected message rather than a list of messages.

In accordance with another aspect of the present invention, beneath the application-related layer is a protocol layer accomplished via a communications-related interface into which a protocol proxy (e.g., a DLL) plugs in. Because of the protocol layer, the communication details and requirements are abstracted from the application programs and the mediation component.

Moreover, the protocol is not fixed, but rather is configurable via a pluggable protocol proxy. Thus, essentially any protocol may be used as agreed upon with an auxiliary device, including protocols not yet developed. Note that the plugging in of the proxy may be automatic or largely automatic in response to the initial detection of the presence of a coupled auxiliary display. For example, a user can couple a smart mobile telephone to a computer, and when the coupling is detected, the display of the mobile telephone can become an auxiliary display by automatically loading an appropriate protocol proxy.

Because of the layered architecture, both the application programs and the auxiliary display device in essence see only an auxiliary device service, which has the respective interfaces needed to properly exchange data. In this manner, communication from any application to any auxiliary display device is possible for which an agreed-upon protocol exists, (e.g., to connect over a USB HID, Bluetooth, and so on, and even, for example, to connect to a web service located essentially anywhere in the world).

Figure 6:
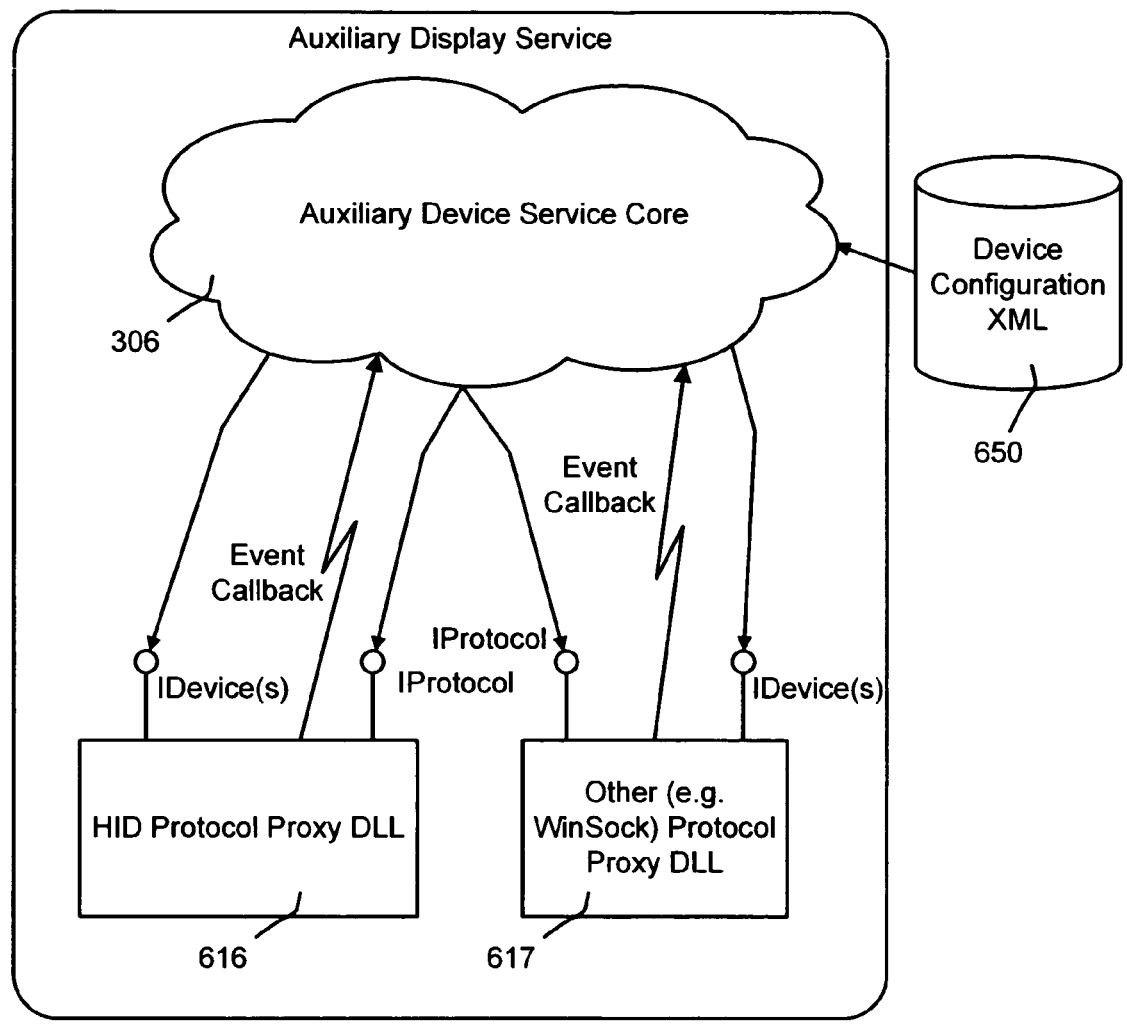
FIG. 6 is a representation of an auxiliary display service in one implementation being able to operate with different types of display devices, in accordance with an aspect of the present invention.

Turning to FIG. 6, the protocol (sometimes referred to as a hardware abstraction) layer of the auxiliary device service 306 is the abstraction that enables the application plug-ins to be routed to one or more of a variety of devices. In one implementation, the physical means of output can vary from as little as a single LED to a full color bitmap auxiliary display, or virtually anything in between (e.g., an alphanumeric display, an auxiliary display with custom segmenting, $2^n$-bit small grayscale bitmap displays, 32-bit larger bitmap displays and so on). The input capabilities also vary, e.g., the actuators can vary from buttons, to switches to capacitive or other sensors including light sensors, motion sensors, mass sensors and so on.

As shown in FIG. 6, in one implementation the protocol proxy comprises a DLL that enables the application content to be directed to a physical device. IDevice and IProtocol interfaces of the proxy are exposed to core code of the auxiliary device service 306, which receives callback events from the proxies. In the example of FIG. 6, examples 616 and 617 are shown for a Universal Serial Bus/Human Interface Device (USB/HID)-based auxiliary display and a WinSock based endpoint, respectively. Note that it is possible to have multiple auxiliary displays having different communication protocols active at the same time. The auxiliary device service maintains data 650 (e.g., an XML-formatted device configuration list) of the protocol proxy providers and their respective capabilities.

Note that to this point, the present invention has been described with applications actively running on the main computer in conjunction with the operating system running (ACPI state S0), referred to herein as an "online" state. However, in alternative scenarios, the auxiliary display can have its own CPU and memory, and this firmware can operate the auxiliary device when the main computer is "offline," e.g., the computer is powered down to some extent, e.g., completely powered down or in a sleep/standby/hibernation state, or the like (S1 or higher ACPI sleep state). If such firmware is present, the auxiliary device can display data while the device is online or offline. If not present, the auxiliary device is only capable of working in an online state. In the online-capable only state, the applications and various components described above run on the main CPU under the operating system.

Figure 7:
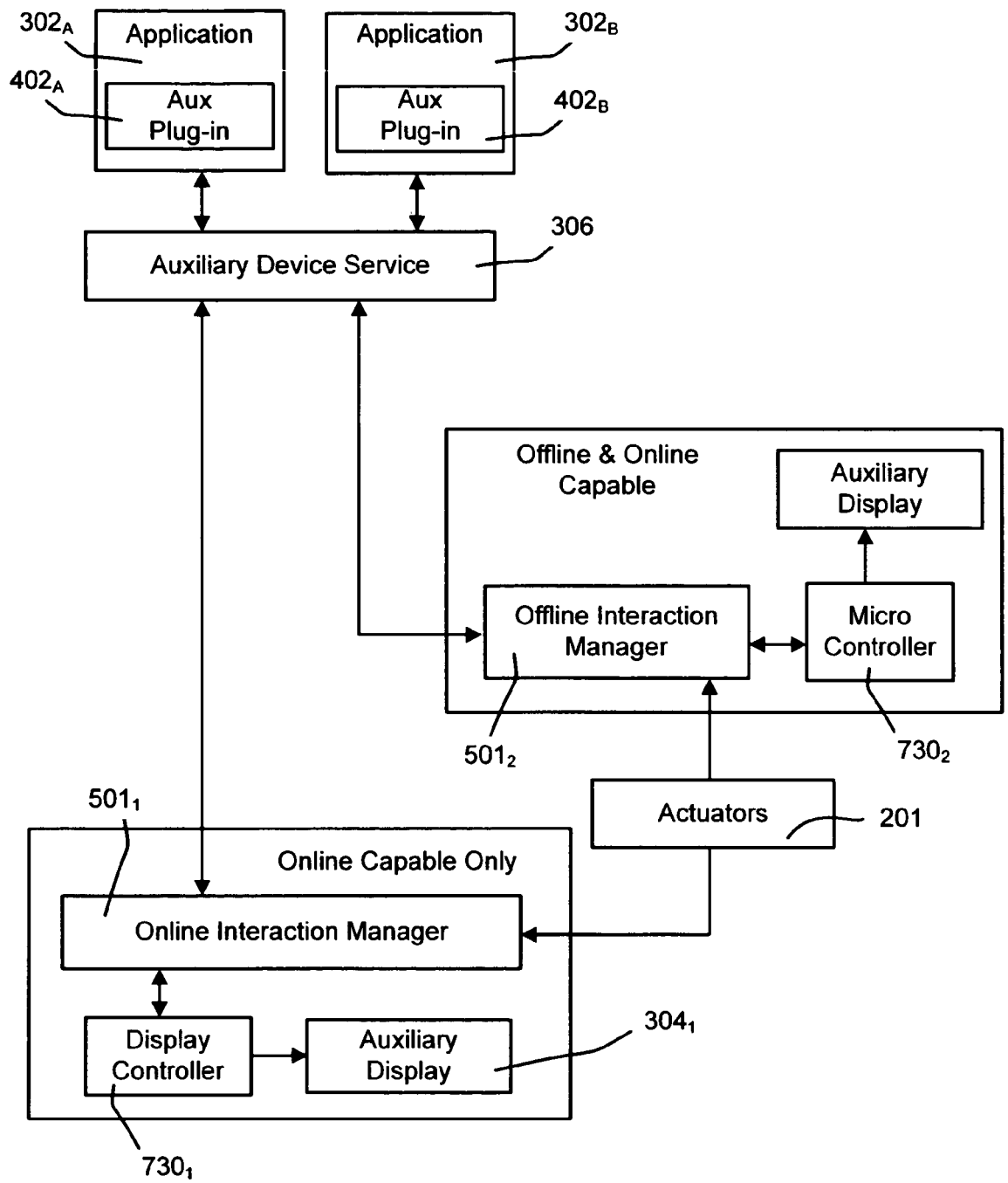
FIG. 7 is a block diagram generally representing components of the layered architecture including firmware by which offline and online operation of an auxiliary display device is possible, in accordance with an aspect of the present invention.

FIG. 7 generally represents the relationship between applications $302_A$ and $302_B$ (in this example having respective auxiliary plug-ins $402_A$ and $402_B$) and the interaction managers when in either one of these two scenarios, namely online capable only or online/offline capable. When online only, the online interaction manager $501_1$ (running in the main CPU operating system) receives user input and via the auxiliary display service 306, may pass corresponding data to the currently selected application program and/or a display controller $730_1$ for processing. Note that this is essentially as described above with respect to FIG. 5. Further, note that even though a device may be offline-capable, these online components may be run whenever the main system is online, because the processing power and memory are usually greater in the online state, and because the applications are running with actual data instead of cached data.

When offline, an offline interaction manager $501_2$ is used. As is understood, the offline interaction manager $501_2$ runs under the auxiliary microcontroller/and offline (e.g., flash or alternatively powered) storage. In general, the offline interaction manager $501_2$ manipulates cached data in response to navigational commands from the actuators 201. An offline shell program, which may be considered part of the offline interaction manager $501_2$ (although it may be a separate component), may provide a home page and includes navigational logic that determines what image (e.g., a bitmap) to display, or what content should be interpreted for rendering to the display, such as by a renderer in the shell. Note that the same actuators and auxiliary display may be used on an online/offline capable device, regardless of whether online or offline, although there may be some differences in what can be displayed due to limitations of the auxiliary processor and/or memory. For example, the resolution of the image may differ if cached bitmaps are used for the offline scenario and space is limited. Note however that there may be advantages to formatting the data sent to the display device in a common navigational (e.g., tree or graph) structure for online and offline, including that the user gets a similar experience and that the various components need not be configured to process different structures depending on the online or offline state. However, the actual data that can be displayed may differ, e.g., if not all of the applications' data may be cached for offline viewing due to storage space limitations, the amount of data to cache is reduced in size (e.g., a tree structure is pruned), as described in the aforementioned U.S. patent application entitled "Caching Data for Offline Display and Navigation of Auxiliary Information." Also, certain types of information would be nonsensical to display when offline, e.g., if the computer has a tape backup unit that gets powered down with the computer system, depicting the powered down state of the tape backup unit on the auxiliary display would provide no value and needlessly consume memory.

As can be seen from the foregoing, an architecture of the present invention enables application programs to provide data at appropriate times to an auxiliary display of a computer system, while at the same time allowing virtually any capable display, whether built-in as a dedicated auxiliary display or an independent device display, to serve as an auxiliary display. The present invention thus provides numerous benefits and advantages needed in contemporary computing with auxiliary display devices.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer system that includes one or more auxiliary display devices and at least one computer program, a system for providing an auxiliary display service that facilitates communication between the at least one computer program and the one or more auxiliary display devices, such that any display device capable of communication with the at least one computer program via the auxiliary display service is capable of displaying information from the at least one computer program, the system comprising:

a regular display coupled to the computer system configured to display information from a plurality of computer programs;

a first auxiliary display device coupled to the computer system to present auxiliary information, the first auxiliary display device comprising any device with a display that is configurable to interface with the computer system, wherein the first auxiliary display is independent of the regular display and includes both a plurality of user interface controls that are not included in a second auxiliary display device and a plurality of display device features that are not included in the second auxiliary display device;

the second auxiliary display device coupled to the computer system to present auxiliary information, the second auxiliary display device comprising any device with a display that is configurable to interface with the computer system, wherein the second auxiliary display is independent of the regular display and includes both a plurality of user interface controls that are not included in the first auxiliary display device and a plurality of display device features that are not included in the first auxiliary display device, wherein the first and the second auxiliary display devices are remote from the computer system;

an auxiliary display service that runs on the computer system and is accessed through an interface by a plurality of computer programs that are running on the computer system, the auxiliary display service configured to abstract display data such that the display data from a single program can be output to many different auxiliary display devices having different display characteristics, the auxiliary display service performing the following:

receive information from the first auxiliary display device describing one or more display constraints that limit the amount of information displayable by the first auxiliary display device, the information including an indication of one or more display features and one or more user interface controls of the first auxiliary display device, the user interface controls indication including a number and type of inputs available on the first auxiliary display device;

receive information from the second auxiliary display device describing one or more display constraints that limit the amount of information displayable by the second auxiliary display device, the information including an indication of one or more display features and one or more user interface controls of the second auxiliary display device, the user interface controls indication including a number and type of inputs available on the second auxiliary display device;

receive from at least one of the plurality of computer programs a function call configured to display information on each of the first and second auxiliary display devices coupled to the computer system, the at least one of the plurality of computer programs being configured to send a variable, selectable amount of information to each of the auxiliary display devices, depending on the indicated display features and the indicated user interface controls of each auxiliary display device, such that the auxiliary display service is configured to output different portions of display information from the same computer program to each of the first and second auxiliary display devices, wherein the portions of display information are based on each device's indicated display features and indicated user interface controls;

based on the received display features and user interface control information from the first auxiliary display device, tailor the information that is to be displayed on the first auxiliary display device as a result of the function call based on the first auxiliary device's indicated display features and indicated user interface controls, such that each portion of the information that is displayable according to the available display features is displayed in a manner corresponding to the first auxiliary display device's display features and is navigable using each of the first auxiliary display device's user interface controls; and based on the received display features and user interface control information from the second auxiliary display device, tailor the information that is to be displayed on the second auxiliary display device as a result of the function call based on the second auxiliary device's indicated display features and indicated user interface controls, such that each portion of the information that is displayable according to the available display features is displayed in a manner corresponding to the second auxiliary display device's display features and is navigable using each of the second auxiliary display device's user interface controls;

an offline interaction manager configured to perform the following upon detecting that the computer system is turned off or is in a standby/hibernate state:

store the tailored information for the first auxiliary display device in a system cache;

store the tailored information for the second auxiliary display device in the system cache;

upon receiving navigation inputs at the first auxiliary display device via the first auxiliary display device's user interface controls, determine which portion of the tailored information stored for the first auxiliary display device is to be displayed on the first auxiliary display device based on which navigation inputs were received;

upon receiving navigation inputs at the second auxiliary display device via the second auxiliary display device's user interface controls, determine which portion of the tailored information stored for the second auxiliary display device is to be displayed on the second auxiliary display device based on which navigation inputs were received;

send the determined portion of stored tailored information for the first auxiliary display device to the first auxiliary display device; and send the determined portion of stored tailored information for the second auxiliary display device to the second auxiliary display device; and a mediation component of the auxiliary display device service that determines which of the at least one of the plurality of computer programs can have tailored information presented and on which of the auxiliary display devices the tailored information can be presented.

2. The system of claim 1 wherein the mediation component communicates information corresponding to an output capability of the auxiliary display devices to the at least one of the plurality of computer programs.

3. The system of claim 1 further comprising a protocol component set containing at least one selectable protocol component, and wherein the auxiliary display service communicates with the auxiliary display device via a selected protocol component selected from the protocol component set that corresponds to a protocol used by the auxiliary display device.

4. The system of claim 3 wherein each said protocol component of the protocol component set plugs into the interface of the auxiliary display service.

5. The system of claim 1, wherein the tailored information received from the auxiliary display service comprises rendering instructions.

6. The system of claim 1 wherein the at least one of a plurality of computer programs each includes a mechanism for receiving events related to the auxiliary display device.

7. The system of claim 6 wherein an event received by a computer program corresponds to a request to provide data for presentation.

8. The system of claim 6 wherein the auxiliary display devices have associated actuators, and wherein an event received by a computer program corresponds to a navigation command.

9. The system of claim 6 wherein the auxiliary display devices have associated actuators, and wherein the mediation component determines which of the at least one of the plurality of computer programs receives events corresponding to actuation of an actuator.

10. The system of claim 1 wherein at least one of the auxiliary display devices is coupled to the computer system via a wireless connection.

11. The system of claim 1, wherein the auxiliary display device includes at least one navigational button that is not included in the regular display.

12. The system of claim 11, wherein tailoring the information that is to be displayed on the auxiliary display device as a result of the function call comprises adjusting the information to indicate that the auxiliary display device accepts navigation commands from the navigational button that is not included in the regular display.

13. The system of claim 1, wherein the cached information is cached in the auxiliary display device's memory.

14. The system of claim 1, wherein the first and the second auxiliary display devices communicate with the computer system using different protocols.

15. The system of claim 1, wherein the first and the second auxiliary display devices implement different interfaces in communicating with the computer system.

16. The system of claim 1, wherein the information is tailored and sent to both the first and the second auxiliary displays simultaneously, the first and the second displays being simultaneously operable.

17. The system of claim 1, further comprising a button configured to switch between a plurality of notifications email notifications, voicemail notifications, calendar notifications, system status notifications and caller ID lists.

18. A computer system that includes a plurality of auxiliary display devices, at least one computer program, and at least one regular display configured to display information from the at least one computer program, a method for providing an auxiliary display service that facilitates communication between the at least one computer program and the auxiliary display devices, such that any display device capable of communication with the at least one computer program via the auxiliary display service is capable of displaying information from the at least one computer program, the method comprising:

receiving, at the auxiliary display service, a function call from at least one of a plurality of computer programs, the function call being configured to display information at a plurality of auxiliary display devices coupled to the computer system, the at least one of the plurality of computer programs being configured to send a variable, selectable amount of information to each of the auxiliary display devices, depending on indicated display features and indicated user interface controls of each auxiliary display device, wherein a first auxiliary display device comprises any device with a display that is configurable to interface with the computer system, the first auxiliary display being independent of the regular display and including both a plurality of user interface controls that are not included in a second auxiliary display device and a plurality of display features that are not included in the second auxiliary display device;

receiving information from the first auxiliary display device describing one or more display constraints that limit the amount of information displayable by the first auxiliary display device, the information including an indication of one or more display features and one or more user interface controls of the first auxiliary display device, the user interface controls indication including a number and type of inputs available on the first auxiliary display device;

receiving information from the second auxiliary display device describing one or more display constraints that limit the amount of information displayable by the second auxiliary display device, the information including an indication of one or more display features and one or more user interface controls of the second auxiliary display device, the user interface controls indication including a number and type of inputs available on the second auxiliary display device;

receiving from at least one of a plurality of computer programs a function call configured to display information on each of the first and second auxiliary display devices coupled to the computer system, the at least one of a plurality of computer programs being configured to send a variable, selectable amount of information to each of the auxiliary display devices, depending on the indicated display features and the indicated user interface controls of each auxiliary display device, such that the auxiliary display service is configured to output different portions of display information from the same computer program to each of the first and second auxiliary display devices, wherein the portions of display information are based on each device's indicated display features and indicated user interface controls;

based on the received display features and user interface control information from the first auxiliary display device, tailoring the information that is to be displayed on the first auxiliary display device as a result of the function call based on the first auxiliary device's indicated display features and indicated user interface controls, such that each portion of the information that is displayable according to the available display features is displayed in a manner corresponding to the first auxiliary display device's display features and is navigable using each of the first auxiliary display device's user interface controls;

based on the received display features and user interface control information from the second auxiliary display device, tailoring the information that is to be displayed on the second auxiliary display device as a result of the function call based on the second auxiliary device's indicated display features and indicated user interface controls, such that each portion of the information that is displayable according to the available display features is displayed in a manner corresponding to the second auxiliary display device's display features and is navigable using each of the second auxiliary display device's user interface controls; and performing the following upon detecting that the computer system is turned off or is in a standby/hibernate state:
  storing the tailored information for the first auxiliary display device in a system cache;
  storing the tailored information for the second auxiliary display device in the system cache;
  upon receiving navigation inputs at the first auxiliary display device via the first auxiliary display device's user interface controls, determining which portion of the tailored information stored for the first auxiliary display device is to be displayed on the first auxiliary display device based on which navigation inputs were received;
  upon receiving navigation inputs at the second auxiliary display device via the second auxiliary display device's user interface controls, determining which portion of the tailored information stored for the second auxiliary display device is to be displayed on the second auxiliary display device based on which navigation inputs were received;
  sending the determined portion of stored tailored information for the first auxiliary display device to the first auxiliary display device; and
  sending the determined portion of stored tailored information for the second auxiliary display device to the second auxiliary display device.

19. The method of claim 18 wherein receiving the function call includes receiving a request to register a computer program for coupling to at least one of the auxiliary display devices.

20. The method of claim 18 wherein receiving the function call includes receiving a request to enumerate capabilities of at least one of the auxiliary display devices.

21. The method of claim 18 further comprising receiving an event and determining information to present on the auxiliary display device based on the event.

22. The method of claim 18 further comprising receiving the requested data and communicating the data to at least one of the auxiliary display devices for presentation.

23. The method of claim 18 further comprising, receiving data from a computer program for presentation on the auxiliary display device, and communicating the data to at least one of the auxiliary display devices for presentation via a pluggable protocol component corresponding to a communications protocol used by at least one of the auxiliary display devices.

24. A computer-readable storage medium having computer-executable instructions, which when executed perform the method of claim 18.

25. The method of claim 18, further comprising receiving a navigation command from the auxiliary display device.

26. The method of claim 25 wherein the navigation command corresponds to a selection of a computer program, and wherein determining information to present on at least one of the auxiliary display devices comprises determining which computer program was selected and sending data to the selected computer program to request that the selected computer program provide data for presenting information on at least one of the auxiliary display devices.

27. The method of claim 25 wherein the navigation command corresponds to navigation within data of a selected computer program, and wherein determining information to present on at least one of the auxiliary display devices comprises sending the navigation command to the selected computer program.

28. The method of claim 18, wherein the determination that the information to be displayed as a result of the received function call has a higher display priority than the information currently being displayed on the auxiliary display device is based on the occurrence of an event.

29. The method of claim 28, further comprising displaying another application's data on the auxiliary display device, the data including information associated with the event.

30. The method of claim 28, further comprising displaying a shell application home page including the information associated with the event.

31. The method of claim 28, further comprising overwriting a portion of the currently displayed content with the information associated with the event.

32. A computer system comprising:
one or more processors;
a memory;
a regular display coupled to the computer system configured to display information from a plurality of computer programs;
a first auxiliary display device coupled to the computer system to present auxiliary information, the first auxiliary display device comprising any device with a display that is configurable to interface with the computer system, wherein the first auxiliary display is independent of the regular display and includes both a plurality of user interface controls that are not included in a second auxiliary display device and a plurality of display features that are not included in the second auxiliary display device;
the second auxiliary display device coupled to the computer system to present auxiliary information, the second auxiliary display device comprising any device with a display that is configurable to interface with the computer system, wherein the second auxiliary display is independent of the regular display and includes both a plurality of user interface controls that are not included in the first auxiliary display device and a plurality of display features that are not included in the first auxiliary display device, wherein the first and the second auxiliary displays are remote from the computer system;
a protocol component set containing at least one selectable protocol component;
an auxiliary display device service that runs on the computer system and communicates with the auxiliary display device via a selected protocol component from the protocol component set that corresponds to the protocol for the auxiliary display device, the auxiliary display device being configured to abstract display data such that the display data from a single program can be output to many different auxiliary display devices having different display characteristics, the auxiliary display service performing the following:
  receive information from the first auxiliary display device describing one or more display constraints that limit the amount of information displayable by the first auxiliary display device, the information including an indication of one or more display features and one or more user interface controls of the first auxiliary display device, the user interface controls indication including a number and type of inputs available on the first auxiliary display device;
  receive information from the second auxiliary display device describing one or more display constraints that limit the amount of information displayable by the second auxiliary display device, the information including an indication of one or more display features and one or more user interface controls of the second auxiliary display device, the user interface controls indication including a number and type of inputs available on the second auxiliary display device;
  receive from at least one of a plurality of computer programs a function call configured to display information on each of the first and second auxiliary display devices coupled to the computer system, the at least one of a plurality of computer programs being configured to send a variable, selectable amount of information to each of the auxiliary display devices, depending on the indicated display features and the indicated user interface controls of each auxiliary display device, such that the auxiliary display service is configured to output different portions of display information from the same computer program to each of the first and second auxiliary display devices, wherein the portions of display information are based on each device's indicated display features and indicated user interface controls;
  based on the received display features and user interface control information from the first auxiliary display device, tailor the information that is to be displayed on the first auxiliary display device as a result of the function call based on the first auxiliary device's indicated display features and indicated user interface controls, such that each portion of the information that is displayable according to the available display features is displayed in a manner corresponding to the first auxiliary display device's display features and is navigable using each of the first auxiliary display device's user interface controls; and
  based on the received display features and user interface control information from the second auxiliary display device, tailor the information that is to be displayed on the second auxiliary display device as a result of the function call based on the second auxiliary device's indicated display features and indicated user interface controls, such that each portion of the information that is displayable according to the available display features is displayed in a manner corresponding to the second auxiliary display device's display features and is navigable using each of the second auxiliary display device's user interface controls; and
an offline interaction manager configured to perform the following upon detecting that the computer system is turned off or is in a standby/hibernate state:
  store the tailored information for the first auxiliary display device in a system cache;
  store the tailored information for the second auxiliary display device in the system cache;
  upon receiving navigation inputs at the first auxiliary display device via the first auxiliary display device's user interface controls, determine which portion of the tailored information stored for the first auxiliary display device is to be displayed on the first auxiliary display device based on which navigation inputs were received;

upon receiving navigation inputs at the second auxiliary display device via the second auxiliary display device's user interface controls, determine which portion of the tailored information stored for the second auxiliary display device is to be displayed on the second auxiliary display device based on which navigation inputs were received;

send the determined portion of stored tailored information for the first auxiliary display device to the first auxiliary display device; and send the determined portion of stored tailored information for the second auxiliary display device to the second auxiliary display device.

33. The system of claim 32 wherein the auxiliary device service receives program data from a computer program running on the computer system and uses the selected protocol component to communicate the data to the auxiliary display for presenting information on the auxiliary display device.

34. The system of claim 32 wherein at least one of the auxiliary display devices receives a command corresponding to an actuator associated with the auxiliary display device that received the command, and uses the selected protocol component to communicate the command to program data within a computer program running on the computer system.

* * * * *